Patented July 1, 1952

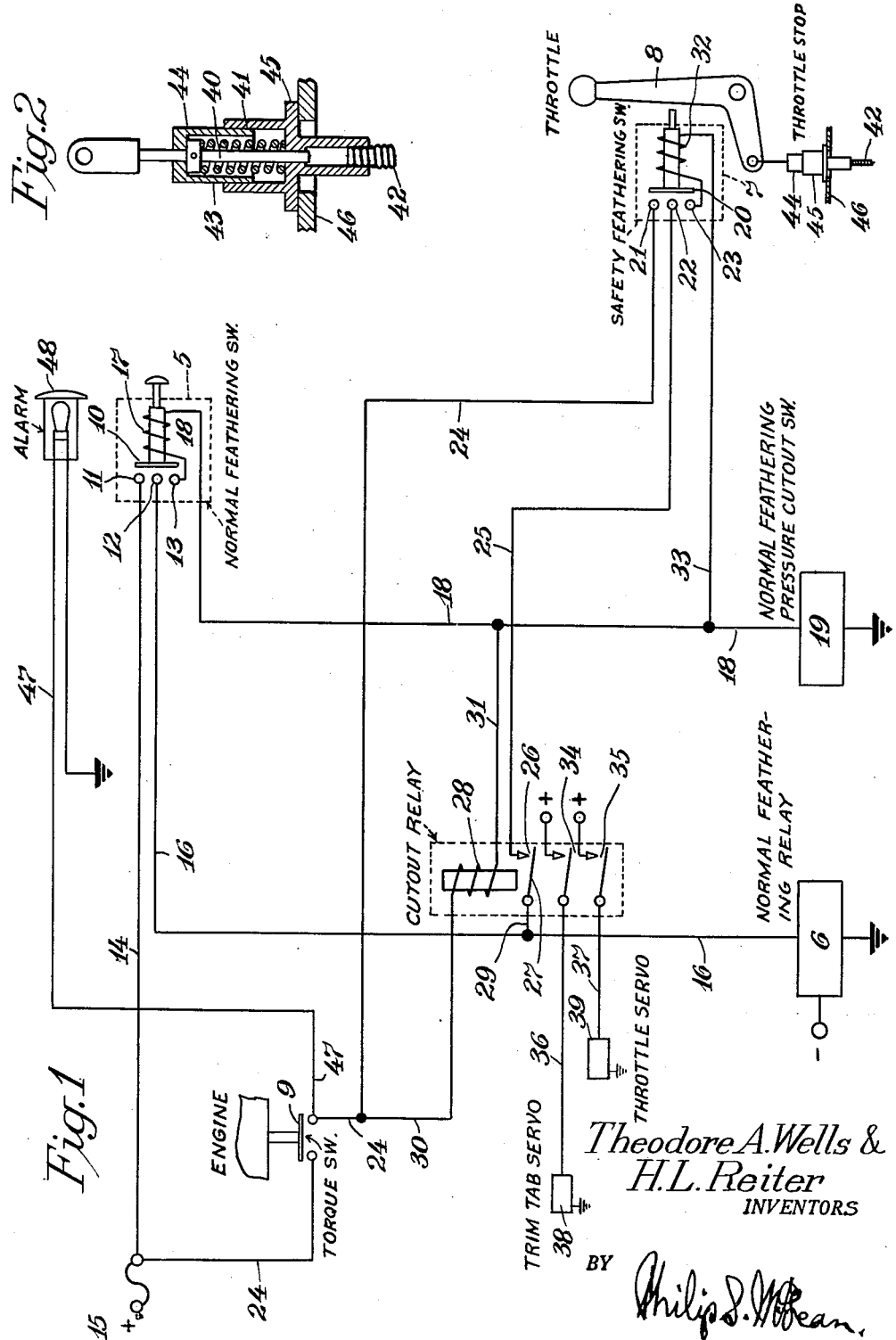

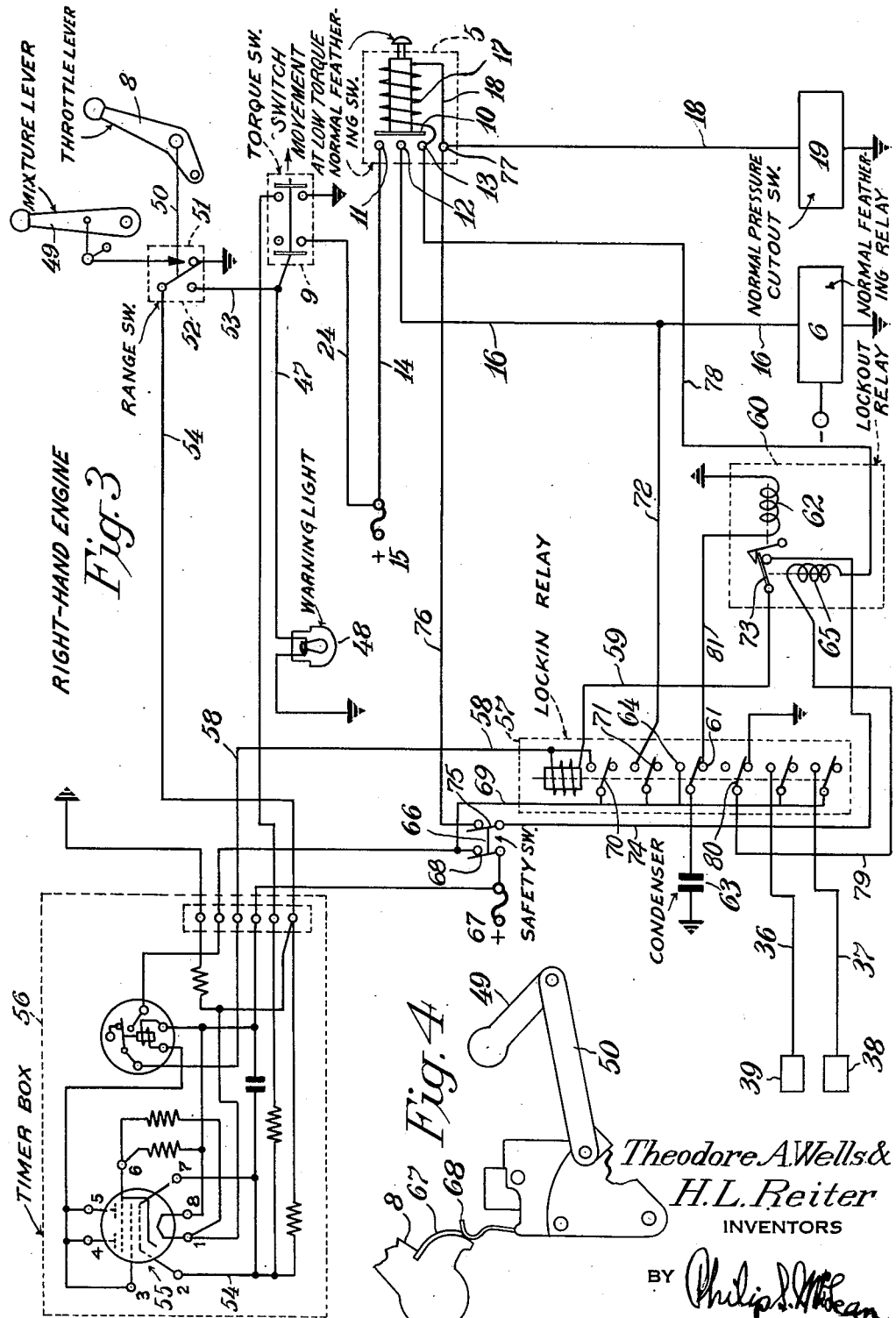

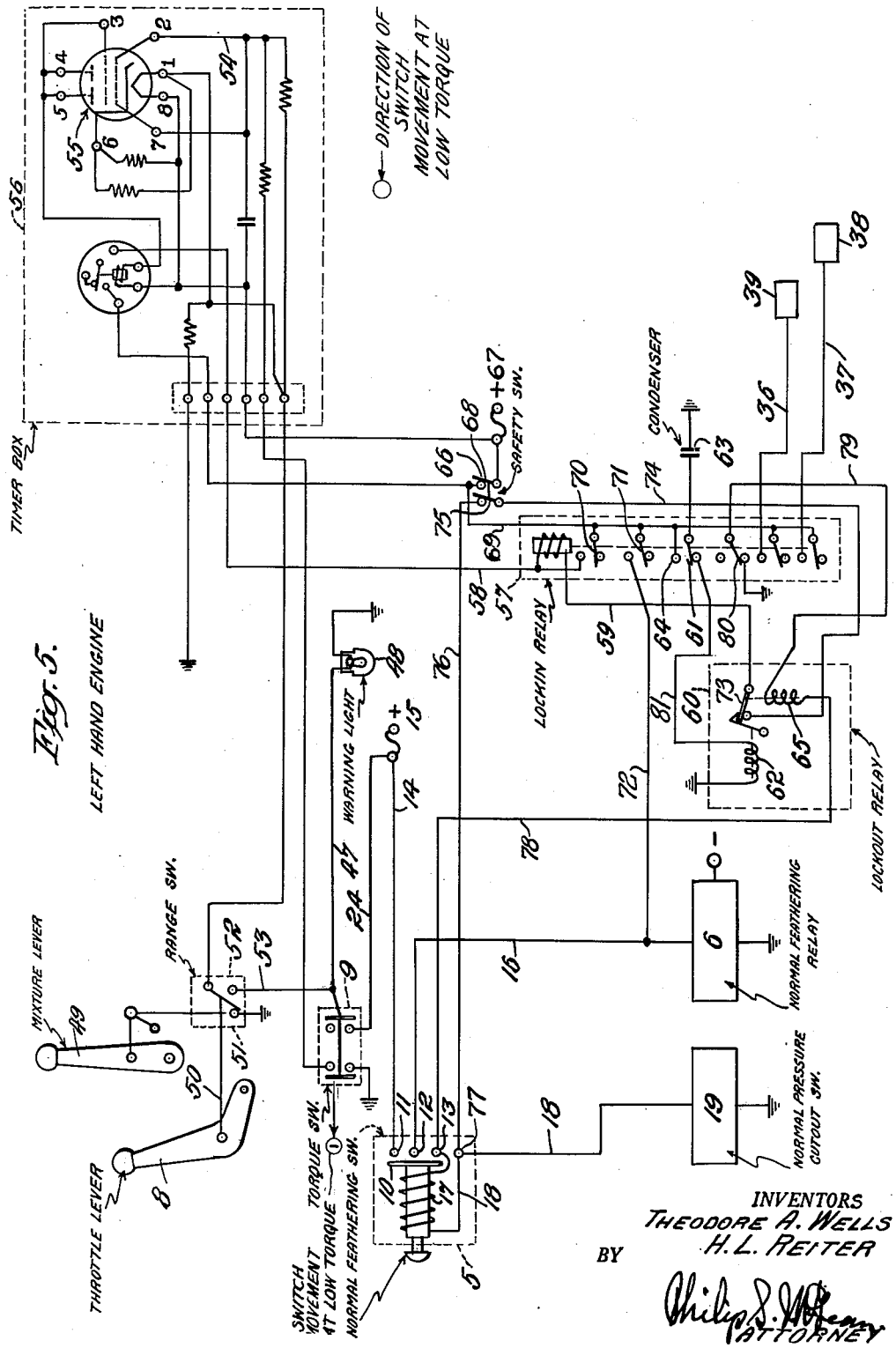

2,601,902

UNITED STATES PATENT OFFICE 2,601,902

MULTIENGINE SAFETY FEATHERING SYSTEM

Theodore A. Wells and Harry L. Reiter, Wichita, Kans., assignors to Beech Aircraft Corporation, Wichita, Kans., a corporation of Delaware Application November 18, 1946, Serial No. 710,724

29 Claims. (Cl. 170—135.29)

1

The invention disclosed in this patent application relates to multi-engine aircraft.

In such aircraft means are usually provided for feathering the propeller of a defective engine to avoid the objectionable "windmilling" effects.

If an engine fails on take-off the pilot is faced with the problem of determining which is the defective engine and must be certain to feather the propeller of that and no other engine. The time required to make sure which engine is not functioning properly introduces a hazard which may cause a pilot to hesitate before initiating any feathering steps. Such delays at times of take-off and the like are particularly dangerous.

Objects of the present invention are to eliminate, so far as possible, the dangers mentioned and to enable immediate and automatic determination of a failing engine and the feathering of the propeller of that engine without hesitation or delay.

Special objects also are to have such a protective system either fully or semi-automatic and in the event of the latter, to have parts so constituted that the reaction of the pilot will be natural and immediate in initiating the automatic engine determining and feathering operation.

Other important objects are to provide a safety system of the character indicated which will not interfere with the normal, usual and proper feathering control operations.

Further objects of the invention are to provide a safety feathering system having the characteristics mentioned which will be readily applicable to existing multiple engine craft, at reasonable cost, and which will be wholly reliable and practical in every way.

Other objects and the novel features through which the purposes of the invention are attained are set forth or will appear in the course of the following specification.

The drawings accompanying and forming part of the specification illustrate certain present commercial embodiments of the invention. Structure and arrangement of parts, however, may be modified and changed as regards the immediate illustration, all within the true intent and broad scope of the invention as herein defined and claimed.

Fig. 1 in the drawings is a diagrammatic view illustrating a semi-automatic form of the invention;

Fig. 2 is a broken part sectional and enlarged view of the throttle stop indicated in Fig. 1;

Fig. 3 is a diagrammatic view of the right-hand engine installation for a fully automatic embodiment of the invention.

Fig. 4 is a fragmentary view of a form of range switch used in the automatic system.

Fig. 5 is a diagrammatic view of the left-hand engine installation for the fully automatic system.

Basically the invention comprises the combining with the normal feathering circuits, certain supervisory circuits having means for sensing absence of power at any particular engine and means operative at a time when such power is in demand to energize and effectuate the full feathering cycle of the propeller of the engine so identified.

In the semi-automatic system it is so arranged that the pilot does not have to do anything further than he would in any case, except to push harder on the throttles, which is just the normal reaction. This additional pressure closes safety feathering switches of all the engines but only the one where required power is missing is permitted to feather. These safety switches having been closed by advanced throttle pressure, the one which has had its circuit armed is automatically held closed until feathering is completed and whereupon it is automatically released.

In the fully automatic system no positive act of the pilot is required to initiate safety feathering, the parts being so arranged that with the throttle and mixture levers in the full power range, loss of required power at any engine for a definite, predetermined interval, such as a second, automatically initiates the feathering of the propeller of the defective engine.

The fundamental circuits for one engine in a semi-automatic system are shown in Fig. 1 as including a normal feathering switch 5, operable to energize the normal feathering relay 6, and a safety feathering switch 7 operable by overthrow play of the throttle lever 8 at the end of the throttle opening movement to energize relay 6 if the torque switch 9, constituting a power sensing means, remains closed because of a lack of power at that engine.

The normal feathering switch is shown at a plunger type switch having a contactor 10 to connect stationary contacts 11, 12 and 13, the first connected by wiring 14 with a battery or other power source at 15, the second connected by wiring 16 with the feathering relay 6, and the third connected with the solenoid coil 17 for retaining the switch plunger in closed circuit relation, said coil being connected by wiring 18 to the normal feathering pressure cutout switch 19.

The safety feathering switch 7 is shown as of the same self-holding, plunger type having a contactor 20 to bridge contacts 21, 22 and 23, similar in effect to the contacts 11, 12, 13. In this case, however, the current supply contact 21 is connected with the current source 15 only through the intermediary of the torque switch 9, as indicated by the wiring 24. Consequently this safety feathering switch will be effective only when the power circuit therefor has been electrically armed by closure of the torque switch 9.

The center contact 22 of the safety feathering switch is shown connected by wiring 25 with a contact point 26 engageable by armature 27 of the cutout relay magnet 28, which armature is connected at 29 with the line 16 running to the normal feathering relay.

The cutout relay at 28 is indicated as connected at 30 with the line 24 from the torque switch, and at 31 with the line 18 running to the normal feathering pressure cutout switch 19.

Consequently, if the torque switch 9 is closed when the final pressure is applied to the throttle lever, circuit will be closed from the source 15 through wiring 24, torque switch 9, wiring 24, 30, to cutout relay 28 and wiring 31, 18, through the normal feathering pressure cutout switch 19. The energizing of relay 28 enables current to flow through the line 24 and contacts 21, 20, 22, of safety feathering switch 7, and through line 25 and the closed relay contacts 26, 27, and wiring 29, 16, through the normal feathering relay 6.

As a result, feathering of the propeller of the disabled engine will be effected by the normal feathering relay 6, the same as it would be by manual operation of the normal feathering switch 5. The safety feathering switch, like the normal feathering switch, is held closed by its solenoid winding 32 until the end of the feathering operation and is then released by the normal feathering pressure cutout switch 19, it being noted that solenoid 32 is connected at 33 with the wire 18 running to said cutout switch.

The cutout relay 28 is shown as operable to close additional switch contacts at 34 and 35 for the circuits 36, 37, of servomotors 38, 39, arranged to operate trim tabs and to correct throttle setting to compensate for feathering of the ineffective engine.

The overthrow necessary to enable the throttle lever to operate the safety feathering switch without loading the throttle control connections, is provided for in the illustration by a compressible spring coupling shown in Fig. 2 as made up of a plunger 40 slidingly confined in a tubular casing or sleeve 41 attached to the push-pull carburetor control connection 42. An expansion spring 43 within the tubular casing, acting against a shoulder 44 on the plunger, normally holds the same projected. A flange 45 on the inner end of the spring casing engages a fixed stop 46 in the full open position of the throttle, approximately in the relation shown in Fig. 1. The further movement of the throttle lever with which the plunger 40 is connected, is permitted by telescoping movement of the plunger within the casing against the pressure of the spring.

A side circuit 47 is shown extended from the open side of the torque switch 9, to a warning or signal lamp 48. This lamp or other signal device will show up as soon as the torque switch closes from loss of power in an engine, thus giving the pilot immediate notice and affording possibility, if circumstances permit, of looking for trouble on that engine before feathering either by the safety system or the normal feathering system.

The flashing of any engine warning light 48 therefore notifies the pilot that one engine is defective and he can then, without even waiting to identify which engine it is, just push in the throttle levers of all engines to their final limit of movement, knowing that only the propeller of the dead engine will be feathered and the aircraft trimmed by servomotors for the engine failure. The operating engine propellers will be prevented from feathering because their torque switches will be open and the safety feathering circuits for those engines be deenergized and unarmed.

The normal feathering pressure cutout switch 19 will open when full feathered position is reached. This deenergizes cutout relay 28, which in releasing its armatures opens circuits at 26, 34 and 35, preventing unfeathering of the propeller or change of trim set by the servomotors. If necessary, though, manual control of the normal feathering switch or manual control of the servomotors may be exercised.

When the throttles are released after actuating the safety feathering switches, before full feathering has been accomplished, the propeller of the defective engine will be brought to full feathered condition and the servomotors will complete their functions because the safety feathering switch of the defective engine will hold itself closed until the pressure cutout switch 19 opens and thus releases the safety feathering switch, after the manner in which it releases the normal feathering switch at the end of a normal feathering operation.

Unfeathering of the propeller may be accomplished by holding in the button of the normal feathering switch in the conventional manner. Trim of the plane also can be returned automatically to power-on condition of the engine through servomotors by actuating the normal feathering switch used to unfeather the propeller.

Details of the torque switches 9 are not shown since these may be either of the mechanically operated type or the pressure operated type, or other known forms of such devices.

Fully automatic feathering in event of engine failure on take-off is attained, without any attention on the part of the pilot, by interlinking the full power demand controls and a timer with the torque switches so that if any engine cuts out for an interval indicating engine failure at such time when full power is required, the feathering controls for that particular engine will go into action and complete their cycle.

In Figs. 3 and 5 the full power demand controls are indicated as a throttle lever 8 and a mixture lever 49 interconnected at 50 into a range switch 51 which in the full power position of the throttle lever and the automatic rich position of the mixture lever, will close a circuit at 52 to carry current through the lines 53, 54, from the closed contacts of the torque switch 9 to the electron timing tube 55 of the timer box 56.

A lockin relay 57, corresponding in general effect to the cutout relay 28 of the semi-automatic system, is connected by wiring 58 with the automatic timer 56 and by wiring 59 through a lockout relay 60 to contact 13 of the normal feathering switch so as to bring it under control of the normal pressure cutout switch 19, by way of solenoid coil 17 and wiring 18.

A lockin relay 57 corresponding in general effect to the cutout relay 28 of the semi-automatic system is connected by wiring 58 with the automatic timer 56 and by wiring 59 through a lockout relay 60 to contact 77 of the normal feathering switch 5 so as to bring it under control of the normal pressure switch 19, by way of line 18.

Thus the closing of the torque switch will effect energizing of the lockin relay 57 on delayed timing when the throttle is in full power position and the mixture lever is set at the automatic rich completing circuit through the normal feathering relay 6 from the power source 67 shown at safety switch 66 through contactor 68, line 69, armature 71, line 72 and line 16.

The automatic feathering circuit described becomes operative only in the full power range of the engine, which may be from approximately three-quarter to full throttle, as determined by the range switch 51 which may be mounted on the carburetor and interlocked with the mixture control lever 49, to cover the range of full power throttle settings from sea level to critical altitude for engine over boost.

This automatic circuit operates with delayed action, due to timer 56 which prevents the automatic feathering circuit from functioning until the torque switch 9 has been closed for a definite interval of, say, one full second. The automatic circuit, therefore, will not operate on a momentary loss of power and may be set to require a full second, for instance, of zero engine torque.

The timer will not activate the automatic circuit, even though the torque switch has been closed for several seconds, unless the mixture control is in the automatic rich position, and then will not operate until one second after the throttle has been moved past the three-quarter open position, and then only if the torque switch remains closed.

The normal feathering pressure cutout switch 19 opens automatically when the full feathered position of the propeller is reached, deenergizing the circuit lockin relay 57. When so deenergized, one set of its contacts 61 activates the lockout coil 62 of the mechanical lockout, electrically reset relay 60 by discharging condenser 63 through that coil, the charging of this condenser having been effected during the feathering cycle through the contact points 64.

When the circuit lockout relay 60 has been activated by the break at the pressure switch 19, the feathering circuit becomes inoperative and the propeller cannot be unfeathered except by normal feathering switch 5, which through connection 59 energizes the mechanical lock trip coil 65 of the lockout relay 60, to automatically reset this automatic feathering circuit lockout relay. This relay, when thus reset, is mechanically locked closed, eliminating the necessity for resetting the same each time the aircraft is used.

The automatic circuit lockout relay 60 is thus tripped by normal feathering pressure cutout switch 19 and reset automatically by the normal feathering switch 5. There are two exceptions to this, however, where, in the illustrated construction there is provided a manually operable safety switch 66 which can be opened to stop the automatic feathering, during a feathering cycle, and whereupon an engine resuming power will unfeather its propeller by engine oil pressure. The circuit lockout relay must then be reset by the normal feathering switch 5. In the second exception, if the propeller is unfeathered by manual control after being feathered by the automatic circuit, the automatic circuit lockout relay must be reset by use of the normal feathering switch 5.

While fully automatic for emergency purposes, the automatic system will not effect feathering under standard procedure for engine shut-down or for sudden increase of power on landing approach or emergency power to clear obstructions, providing the engine exceeds windmilling R. P. M. (approximately 1100 R. P. M.) a second after throttle lever has reached full power range, or high altitude flying with throttle in full power position and mixture set at automatic lean.

The fully automatic circuit will effect the feathering of the propeller of a definite engine and operate servomotors to actuate trim tabs and correct throttle settings to trim an aircraft about yaw axis. Return of trim and power can be accomplished through use of the normal feathering button employed in every case to unfeather propellers during flight, with possibly the exceptions noted above, that is, in which the normal feathering switch is used to reset the circuit which will return trim.

The range switch may be constituted as indicated in Fig. 4, with cooperable contacts 67, 68, positioned by the throttle and mixture levers to engage only in the full power range positions of such levers. This switch, therefore, allows the system to operate only when the throttle is in the take-off or "Meto" power range of the throttle quadrant.

The normal feathering switch may be of the conventional design in which operation at one time will effect feathering and, when the feathering cycle is completed, it will, through shifting of an oil valve in the hub of the propeller to unfeathering position, be effective then, when next operated, to accomplish unfeathering of the propeller.

Because of such factors being known, no further description of such parts is necessary here. The same is true as to the timer box which in itself may be of known design.

In the case of the fully automatic system, both engines, in the case of a two-engine installation, may operate through the same timer, in parallel relation.

The lockin relay 57 assures continuance of the feathering operation, once the feathering has been started and the lockout relay in the fully automatic system prevents additional operation, once the system has been started. The latter is to prevent both engines from feathering at the same time, or a second engine after the first has been feathered.

The lockin relay 57 assures completion of the feathering cycle. This relay is closed initially by power supplied from the timer through line 58 but does not depend on this line for power during the feathering cycle as it is connected to an external power source at 67 through safety switch 66, contactor 68, line 69, armature 79 of lockin relay 57, where power from 67 backfeeds to relay coil through a portion of line 58. The ground circuit for relay 57 is through line 59, armature 73 (which is mechanically locked closed), through line 74, contactor 75 of safety switch 66, line 76, contact 77 of normal feathering switch 5, line 18 to ground through normal pressure cutout switch 19. This relay will remain closed once the feathering cycle is initiated until a break in circuit occurs at pressure switch 19 deenergizing relay 57 which has been feeding power to the normal feathering relay 6 from power source 67 through safety switch 66, contactor 68, line 69, armature 71, line 72, and line 16. When switch 19 opens during the auto feathering cycle de-energizing relay 57, condenser 63 is discharged, tripping the lock on relay 60, making further energizing of this circuit impossible until relay 60 has been reset by the normal feathering switch 5 during the unfeathering cycle. Condenser 63 is charged during the feathering cycle by power supplied through the common hot lead wire 69 of relay 57 from power source 67 through contact 64 and discharged through contact 61, line 81, coil 62, of relay 60 opening circuit of relay 57 to ground.

Lockout relay 60 is reset during the unfeathering cycle when normal feathering switch 5 is closed manually as follows: Power is supplied from power source 15 through line 14, contact 11, contactor 10, contact 13, line 78, energizing coil 65 of lockout relay 60 closing armature 73 across contacts actuated by this coil allowing the mechanical lock to drop in place maintaining these contacts in the closed position when coil 65 is de-energized at the end of the unfeathering cycle thereby completing the auto feathering circuit for future use.

Feathering switch 5 is used during the manual feathering or unfeathering of the propeller and is energized from power source at 15, line 14, contact 11, contactor 10, contact 12, through coil 17, of feathering switch 5, line 18, to ground at normal pressure cutout switch 19.

The warning light or signal in the fully automatic system may be connected in series with the range switch or otherwise arranged so that it will function only under conditions described when automatic feathering is initiated.

What is claimed is:

1. A safety feathering system for plural engine aircraft having feathering propellers, means for independently feathering different individual propellers and engine control means for effecting maximum power demand on take-off, and comprising safety feathering control means arranged for actuation by said engine control means in the power demand operation of the latter and operating connections from said safety feathering control means to said feathering means, including torque sensing means operable by each engine and connected to complete said operating connections between said safety feathering control means and said feathering means in the absence of engine torque and whereby feathering of the propeller of an engine failing to deliver power on demand will be automatically effected.

2. A safety feathering system for plural engine aircraft having feathering propellers, feathering means for independently feathering different individual propellers and engine control means for imposing power demand on the engines, and comprising safety feathering control means actuated by said engine control means in the power demand operation of the latter, operating connections from said safety feathering control means to said propeller feathering means including torque sensing means operable by each engine and connected to complete said operating connections between said safety feathering control means and said propeller feathering means in the absence of engine torque and means included in said operating connections for maintaining the propeller feathering means rendered operative by said torque sensing means in operation for a complete propeller feathering cycle.

3. A safety feathering system for plural engine aircraft having feathering propellers, feathering means for independently feathering different individual propellers and engine control means for imposing power demand on the engines, and comprising safety feathering control means actuated by said engine control means in the power demand operation of the latter, operating connections from said safety feathering control means to said propeller feathering means including torque sensing means operable by each engine and connected to complete said operating connections between said safety feathering control means and said propeller feathering means in the absence of engine torque and means included in said operating connections for maintaining the propeller feathering means rendered operative by said torque sensing means in operation for a complete propeller feathering cycle, and a manually operable safety control connected to stop said automatic feathering cycle to enable unfeathering of the propeler of an engine resuming power.

4. A safety feathering system for plural engine aircraft having feathering propellers, feathering means for independently feathering different individual propellers and engine control means for imposing power demand on the engines, and comprising safety feathering control means actuated by said engine control means in the power demand operation of the latter, operating connections from said safety feathering control means to said propeller feathering means including torque sensing means operable by each engine and connected to complete said operating connections between said safety feathering control means and said propeller feathering means in the absence of engine torque and means included in said operating connections for rendering said safety feathering control means ineffective at the end of a power failing engine propeller feathering cycle.

5. A safety feathering system for plural engine aircraft having feathering propellers, feathering means for independently feathering different individual propellers and engine control means for imposing power demand on the engines, and comprising safety feathering control means actuated by said engine control means in the power demand operation of the latter, operating connections from said safety feathering control means to said propeller feathering means including torque sensing means operable by each engine and connected to complete said operating connections between said safety feathering control means and said propeller feathering means in the absence of engine torque and means included in said operating connections for delaying operation of said propeller feathering means for a definite interval of engine power failure.

6. A safety feathering system for plural engine aircraft having feathering propellers, feathering means for independently feathering different individual propellers and engine control means for imposing power demand on the engines, and comprising safety feathering control means actuated by said engine control means in the power demand operation of the latter, operating connections from said safety feathering control means to said propeller feathering means including torque sensing means operable by each engine and connected to complete said operating connections between said safety feathering control means and said propeller feathering means in the absence of engine torque and engine failure indicating means connected for operation by the torque sensing means at any of the engines.

7. A safety feathering system for plural engine aircraft having feathering propellers, feathering means for independently feathering different individual propellers and engine control means for imposing power demand on the engines, and comprising safety feathering control means actuated by said engine control means in the power demand operation of the latter, operating connections from said safety feathering control means to said propeller feathering means including torque sensing means operable by each engine and connected to complete said operating connections between said safety feathering control means and said propeller feathering means in the absence of engine torque, trim control means and means in said operating connections for effecting oepration of said trim control means upon completion of said operating connections by said torque sensing means as described.

8. A safety feathering system for plural engine aircraft having feathering propellers, feathering means for independently feathering different individual propellers and engine control means for imposing power demand on the engines, and comprising safety feathering control means actuated by said engine control means in the power demand operation of the latter, operating connections from said safety feathering control means to said propeller feathering means including torque sensing means operable by each engine and connected to complete said operating connections between said safety feathering control means and said propeller feathering means in the absence of engine torque, said power demand engine control means including a member having a predetermined range of movement and a limited overthrow movement and said safety feathering control means including an element for operating the same positioned to be actuated by said member in said overthrow movement of the same.

9. A safety feathering system for plural engine aircraft having feathering propellers, feathering means for independently feathering different individual propellers and engine control means for imposing power demand on the engines, and comprising safety feathering control means actuated by said engine control means in the power demand operation of the latter, operating connections from said safety feathering control means to said propeller feathering means including torque sensing means operable by each engine and connected to complete said operating connections between said safety feathering control means and said propeller feathering means in the absence of engine torque, said power demand engine control means including members independently movable for effecting different engine controls and a range switch connected in controlling relation in said operating connections and operable only in the full power range position of said engine control members.

10. A safety feathering system for plural engine aircraft having feathering propellers, propeller feathering means for independently feathering different individual propellers and normal feathering controls connected to effect selective operation of the propeller feathering means of different engines, and comprising safety feathering controls and connections therefrom for actuating the feathering means for any of the different propellers and including engine torque sensing means operable by each individual engine and connected to complete said operating connections from said safety feathering control means to the propeller feathering means of an engine failing to deliver torque, independently of said normal feathering controls.

11. A safety feathering system for plural engine aircraft having feathering propellers, propeller feathering means for independently feathering different individual propellers and normal feathering controls connected to effect selective operation of the propeller feathering means of different engines, and comprising safety feathering controls and connections therefrom for actuating the feathering means for any of the different propellers and including engine torque sensing means operable by each individual engine and connected to complete said operating connections from said safety feathering control means to the propeller feathering means of an engine failing to deliver torque, independently of said normal feathering controls, and said operating connections further including means for interposing a definite time delay of engine failure in the initiation of operation of the propeller feathering means of a power failing engine identified by the torque sensing means aforesaid.

12. A safety feathering system for plural engine aircraft having feathering propellers, propeller feathering means for independently feathering different individual propellers and normal feathering controls connected to effect selective operation of the propeller feathering means of different engines, and comprising safety feathering controls and conections therefrom for actuating the feathering means for any of the different propellers and including engine torque sensing means operable by each individual engine and connected to complete said operating connections from said safety feathering control means to the propeller feathering means of an engine failing to deliver torque, independently of said normal feathering controls, and said operating connections further including means for interposing a definite time delay of engine failure in the initiation of operation of the propeller feathering means of a power failing engine identified by the torque sensing means aforesaid, and engine identifying signals operated by the torque sensing means of the different engines independently of and apart from said time delay.

13. A safety feathering system for plural engine aircraft having feathering propellers and propeller feathering means for independently feathering different individual propellers, and comprising safety feathering control means, operating connections from said safety feathering control means to said propeller feathering means including torque sensing devices operable by the respective engines and connected to complete operating connections from said safety feathering control means to the propeller feathering means of engines failing to deliver required torque and engine identifying signals operated by the torque sensing devices of the individual engines independently of said operating connections to thereby immediately indicate a power failing engine independently of the feathering action of the propeller driven by the same.

14. An automatic safety feathering system for plural engine aircraft having feathering propellers and propeller feathering means for independently feathering the propellers of different individual engines, and comprising power demand control means for the engines, torque switches controlled by the individual engines and operating connections from said engine control means through the torque switches of the individual engines to the propeller feathering means of the different engines and including a range switch operable by said engine controlling means to complete said operating connections only in the maximum power range position of said engine controlling means.

15. An automatic safety feathering system for aircraft having plural engines with throttle and mixture control members, feathering propellers and means for independently feathering the propellers of different engines, and comprising torque switches controlled by the individual engines and operating connections from said engine torque switches to said propeller feathering means including range switches jointly operated by said throttle and mixture control members to close the circuit connections of said torque switches only in the full power range position of said throttle and mixture control members.

16. A safety feathering system for plural engine aircraft having feathering propellers and propeller feathering means for independently feathering different individual propellers, and comprising safety feathering control means and connections therefrom for actuating the feathering means for any of the different propellers and including torque switches operable by the individual engines and connected to complete operating connections from said safety feathering control means to the propeller feathering means of an engine failing to deliver torque and an electronic timer connected with said torque switches to delay operation of the propeller feathering means selected by a torque switch for a definite time interval providing opportunity for a failing engine to resume power.

17. A safety feathering system for plural engine aircraft having feathering propellers and propeller feathering means for independently feathering different propellers, and comprising safety feathering control means and connections therefrom for actuating the feathering means for any of the different propellers and including engine torque sensing means operable by individual engines and connected to complete said operating connections from said safety feathering control means to the propeller feathering means of an engine failing to deliver torque and means in said connections for compelling complete feathering operation of the propeller of an engine failing to deliver torque.

18. A safety feathering system for plural engine aircraft having feathering propellers and propeller feathering means for independently feathering different propellers, and comprising safety feathering control means and connections therefrom for actuating the feathering means for any of the different propellers and including engine torque sensing means operable by individual engines and connected to complete said operating connections from said safety feathering control means to the propeller feathering means of an engine failing to deliver torque, trim control means for said aircraft and means in said operating connections for effecting operation of said trim control means upon completion of said operating connections by said torque sensing means as described.

19. An automatic feathering control system for a twin engine installation, each installation including a feathering propeller with a feathering mechanism, having manual throttle controls for said engines and manual controls for the propeller feathering mechanisms, switch means to connect the automatic control system with said feathering mechanisms at will, means associated with said throttle controls to render said automatic system operative only when each throttle control is operated in the power demand position, means responsive to a predetermined low torque output of each engine, indicative of an engine failure, in said automatic control system to actuate said propeller feathering mechanism to feather the propeller of the failing engine, and time delay means in said automatic control system to discriminate between momentary fluctuations of torque output and an actual engine failure to cause said automatic control system to feather the propeller only upon engine failure.

20. An engine failure responsive automatic feathering system for an aircraft engine-driven variable pitch propeller comprising, in combination, torque responsive means actuable on the occurrence of an engine failure, feathering switch means operable by said torque responsive means and a propeller feathering circuit electrically connected to the feathering switch means to be energized by said feathering switch means on operation of the latter by said torque responsive means.

21. A system operable on engine failure to automatically feather a variable pitch propeller which has an operative connection with an aircraft engine comprising, in combination, torque responsive means operatively connected to the engine and actuable on the occurrence of an engine failure, feathering switch means wired in circuit with said torque responsive means to be activated thereby and a propeller feathering circuit electrically connected to the feathering switch means to be energized by said feathering switch means on activation of the latter by said torque responsive means.

22. An engine failure responsive automatic feathering system for an aircraft engine driven variable pitch propeller comprising, in combination, torque responsive means actuable on the occurrence of an engine failure, time lag means incorporated in said torque responsive means to prevent the activation of said torque responsive means by a momentary power failure, feathering switch means wired in circuit with said torque responsive means to be activated thereby and a propeller feathering circuit electrically connected to the feathering switch means to be energized by said feathering switch means on operation of the latter by said torque responsive means.

23. A system adapted on engine failure to automatically feather an aircraft engine driven variable pitch propeller comprising, in combination, torque responsive means arranged for operation by an aircraft engine, feathering switch means wired in circuit with said torque responsive means for actuation thereby on engine failure, throttle switches for preventing power from flowing to said torque responsive means when the throttle is retarded and a propeller feathering circuit electrically connected to the feathering switch means to be energized by said feathering switch means on actuation of the latter by said torque responsive means.

24. An automatic safety feathering system for plural engine aircraft comprising in combination with propeller feathering means and means for sensing lack of power at each engine, lockin relay means for maintaining operation of a selected engine propeller feathering means throughout a predetermined feathering cycle and selector means controlled by the individual engine power loss sensing means for automatically connecting said lockin relay means with the propeller feathering means of a particular engine losing power identified by said power loss sensing means.

25. An automatic safety propeller feathering system for plural engine aircraft comprising in combination with propeller feathering means, power loss detecting means and power range devices for arming said power loss detecting means in the maximum power range of each engine and selector means controlled by said power loss detecting means when so armed for automatically effecting the energization of the propeller feathering means of a power losing engine detected by the power loss detecting means of such an engine.

26. A safety propeller feathering system comprising in combination with a normal propeller feathering unit for each engine of a plural engine installation, means for detecting loss of engine torque at each engine, means under control of said engine torque loss detecting means for instituting delayed action propeller feathering operation of the normal feathering system of a torque losing engine identified by said torque loss detecting means and a master control for immediately removing delayed action control of said last mentioned means and for restoring said normal feathering means to operative condition independent of said engine torque loss detecting means.

27. An automatic safety propeller feathering system comprising in combination with the normal feathering system of the individual engines of a plural engine installation, a torque switch for each engine, lockin relay means for maintaining said feathering systems operative throughout a predetermined feathering cycle and selector relay means controlled by said torque switches for automatically connecting said lockin relay means with the normal feathering system of a torque losing engine detected by one of said torque switches.

28. An automatic feathering system for multi-engine aircraft comprising propeller feathering means for each engine, an automatic torque switch for each engine, selectively operable servomotors and an engine selector relay controlled by individual torque switches and connected to control selective operation of said servomotors.

29. An automatic feathering system for multi-engine aircraft comprising propeller feathering means for each engine, an automatic torque switch for each engine, selectively operable servomotors and an engine selector relay controlled by individual torque switches and connected to control selective operation of said servomotors and means for delaying operation of said servomotors for a predetermined interval of engine failure.

THEODORE A. WELLS.
HARRY L. REITER.

REFERENCES CITED

The following references are of record in the file of this patent:

UNITED STATES PATENTS

| Number | Name | Date |
|---|---|---|
| 2,257,126 | Rindfleisch | Sept. 30, 1941 |
| 2,320,195 | Rindfleisch | May 25, 1943 |
| 2,339,090 | McIntosh | Jan. 11, 1944 |
| 2,346,007 | Chillson | Apr. 4, 1944 |
| 2,374,276 | French | Apr. 24, 1945 |
| 2,471,953 | Hamilton | May 31, 1949 |